US007822292B2

United States Patent
Jin

(10) Patent No.: US 7,822,292 B2
(45) Date of Patent: Oct. 26, 2010

(54) RENDERING IMAGES UNDER CYLINDRICAL PROJECTIONS

(75) Inventor: Hailin Jin, Campbell, CA (US)

(73) Assignee: Adobe Systems Incorporated, San Jose, CA (US)

(*) Notice: Subject to any disclaimer, the term of this patent is extended or adjusted under 35 U.S.C. 154(b) by 984 days.

(21) Appl. No.: 11/638,990

(22) Filed: Dec. 13, 2006

(65) Prior Publication Data

US 2008/0144973 A1   Jun. 19, 2008

(51) Int. Cl.
  *G06K 9/32* (2006.01)
  *G09G 5/399* (2006.01)
  *H04N 7/00* (2006.01)
(52) U.S. Cl. .................. 382/296; 345/540; 348/36
(58) Field of Classification Search ............ 382/162, 382/276, 284, 296, 305, 312; 345/419, 609, 345/629, 649, 653; 358/515, 540; 348/36–39
See application file for complete search history.

(56) References Cited

U.S. PATENT DOCUMENTS

| | | | |
|---|---|---|---|
| 5,396,583 A | | 3/1995 | Chen et al. |
| 6,028,584 A | | 2/2000 | Chiang et al. |
| 6,205,259 B1 | * | 3/2001 | Komiya et al. ............ 382/284 |
| 6,678,423 B1 | * | 1/2004 | Trenary et al. ............ 382/250 |
| 2006/0007411 A1 | * | 1/2006 | Harrison et al. ............ 353/119 |
| 2006/0017720 A1 | * | 1/2006 | Li ............................ 345/419 |
| 2006/0072176 A1 | * | 4/2006 | Silverstein et al. .......... 358/540 |
| 2007/0132759 A1 | * | 6/2007 | Mallick et al. ............. 345/426 |

OTHER PUBLICATIONS

Szeliski et al., "Creating Full View Panoramic Image Mosaics and Environment Maps," Computer Graphics Proceedings, Proceedings of Siggraph Annual International Conference on Computer Graphics and Interactive Techniques, Aug. 3, 1997, pp. 251-258.
Takashi et al., "Cylindrical Panorama Using the Tilt of a Camera," IAPR Workshop on Machine Vision Applications, Dec. 11, 2002, pp. 596-599.
Zhang et al., "Efficient 3-DOF Image Alignment for Mobile Panorama Modelling," Electronics Letters, IEE Stevenage, GB, vol. 43, No. 7, Mar. 29, 2007, pp. 383-385.
International Search Report from related International Application No. PCT/US2007/087026 mailed Jun. 12, 2009, 14 pages.

* cited by examiner

*Primary Examiner*—Kanji Patel
(74) *Attorney, Agent, or Firm*—Fish & Richardson P.C.

(57) ABSTRACT

Systems, methods, and apparatus, including computer program products, are provided for forming composite images. In some implementations, a method is provided. The method includes receiving a set of component images for forming a composite image, defining a projection for the set of images transforming each component image into a projected component image, and rendering the projected component images to form the composite image. The rendering of each component image includes decomposing a rotation of the projection into separate rotations for each axis, rotating the component image along a first axis, separately identifying pixel values for each row and each column of the projected component image, and rotating the image along a third axis to form a rendered component image.

27 Claims, 3 Drawing Sheets

RENDERING IMAGES UNDER CYLINDRICAL PROJECTIONS

BACKGROUND

This specification relates to composite image formation.

Image capture devices, such as cameras, can be used to capture an image of a section of a view, such as a section of a landscape. The section of the view whose image is captured by a camera is known as the field of view of the camera. Adjusting a lens associated with a camera may increase the field of view. However, there is a limit beyond which the field of view of the camera cannot be increased without compromising the quality or resolution of the captured image. It is sometimes necessary to capture an image of a view that is larger than can be captured within the field of view of a camera. To do so, multiple overlapping images of segments of the view can be taken and then the images can be joined together (e.g., merged) to form a composite image, e.g., as a panoramic or a mosaic image.

To form a composite image, the relative positions of the component images representing adjacent sections of the view must be determined. In some systems, two component images are aligned. Additional component images are aligned with respect to the first two component images. Images can be aligned for example, using camera properties, e.g., focal length, as well as image information, e.g., pixel data. One technique for aligning images is described in U.S. Pat. No. 7,103,236, which is incorporated by reference.

One technique for forming a composite image from aligned component images projects the images onto a circular cylinder, i.e., generates a "cylindrical projection". A focal length and rotation angles associated with each image can be used to map the image onto a cylinder. For example, the orientation of the camera can be represented as a set of rotation angles from a reference orientation. The cylindrically mapped component images have less distortion than images mapped directly onto a plane. The cylinder can be unwrapped to derive a planar composite image, to print the composite image, for example. A description of using cylindrical projections to form a composite image is found in U.S. Pat. No. 7,006,707, which is incorporated by reference.

The composite image is often further processed to blend the seams of the overlapping component images. For example, pixel values along the seams of the overlapping component images can be modified to provide a smooth transition between the images.

SUMMARY

Systems, methods, and apparatus, including computer program products, are provided for forming composite images. In general, in one aspect, a method is provided. The method includes receiving a set of component images for forming a composite image, defining a projection for the set of images transforming each component image into a projected component image, and rendering the projected component images to form the composite image. The rendering of each component image includes decomposing a rotation of the projection into separate rotations for each axis, rotating the component image along a first axis, separately identifying pixel values for each row and each column of the projected component image, and rotating the image along a third axis to form a rendered component image.

Implementations of the method can include one or more of the following features. Rotating the component image along the first axis can include isolating the effect of the rotation along the first axis, where the first axis is orthogonal to a plane of the component image. Rotating the component image along the second axis can include shifting the image along a projection surface including adjusting a bounding box of the component image.

Identifying pixel values for a row can include defining the coordinates of the component image with respect to a rotation about a second axis while disregarding rotations along any other axis, holding the column value constant for each point in a particular row of the component image, and calculating the pixel value for pixels in each row of the projected component image using one or more pixel values in the corresponding row of the original component image. The method can further include down-sampling the row of the original component image to match a size of the corresponding row of the projected component image prior to calculating pixel values for points in the row of the projected component image.

Identifying pixel values for a column can include defining the coordinates of the component image with respect to a rotation about a second axis while disregarding rotations along any other axis, holding the row value constant for each point in a particular column of the component image, and calculating the pixel value for pixels in each column of the projected component image using one or more pixel values in the corresponding column of the original component image. The method can further include down-sampling the column of the original component image to match a size of the corresponding column of the projected component image prior to calculating pixel values for points in the column of the projected component image.

In general, in one aspect, a computer program product is provided. The computer program product is encoded on a tangible program carrier and operable to cause data processing apparatus to perform operations. The operations include receiving a set of component images for forming a composite image, defining a projection for the set of images transforming each component image into a projected component image, and rendering the projected component images to form the composite image. The rendering of each component image includes decomposing a rotation of the projection into separate rotations for each axis, rotating the component image along a first axis, separately identifying pixel values for each row and each column of the projected component image, and rotating the image along a third axis to form a rendered component image.

In general, in one aspect, a system is provided. The system includes a user interface is device and one or more computers operable to interact with the user interface device. The one or more computers operable to receive a set of component images for forming a composite image, define a projection for the set of images transforming each component image into a projected component image, and render the projected component images to form the composite image. The rendering of each component image includes decomposing a rotation of the projection into separate rotations for each axis, rotating the component image along a first axis, separately identifying pixel values for each row and each column of the projected component image, and rotating the image along a third axis to form a rendered component image.

Implementations of the system can include one or more of the following features. The one or more computers can include a server operable to interact with the user interface device through a data communication network, and the user interface device is operable to interact with the server as a client. The user interface device can include a personal computer running a web browser or a mobile telephone running a wireless application protocol (WAP) browser. The one or more computers can include one personal computer, and the personal computer can include the user interface device.

Particular embodiments of the subject matter described in this specification can be implemented to realize one or more of the following advantages. Composite images are rendered efficiently. Clear composite images are rendered because aliasing effects are limited.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
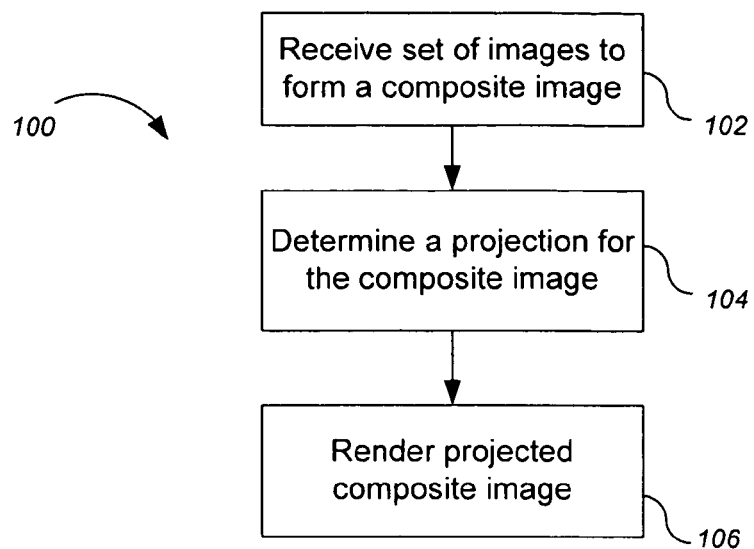
FIG. 1 illustrates an example process for generating a composite image.

FIG. 1 illustrates an example process 100 for generating a composite image. For convenience, the process will be described with reference to a computer system that performs the process. The system receives two or more component images to form a composite image (e.g., a panoramic image) (step 102). The component images can be generated, for example, using a camera rotating about a point in order to capture different segments of a view. For example, an individual can generate a first component image (e.g., take a picture) and then rotate the camera by some amount allowing the user to capture another view of the scene in a second component image, where portion of the second component image overlaps a portion of the first component image.

The system determines a projection for the composite image (step 104). To assemble the set of component images into a composite image, the system aligns the component images and then projects the images to a surface. The images are aligned, for example, using information associated with the component images, e.g., pixel information. The pixel information can be used to identify overlapping points in the component images.

Once aligned, the images are projected onto a surface, for example, an interior surface of a cylinder. The images can be projected onto other surfaces, e.g., a sphere, however for convenience a projection to a cylinder is described. The cylinder is defined using, for example, the focal length of the component images and a scaling factor. The scaling factor defines a change in scale for the component image (e.g., larger or smaller) from the original version of the component image to the projected version of the component image.

To determine the location of each component image on the projection surface, a rotation is defined. The rotation is defined from a particular reference frame (e.g., a spatial position about which the camera is rotated) to preserve the alignment of the component images relative to each other.

The rotation of an image can be defined by a rotational matrix R defining a relative orientation between a global reference frame and the reference frame of the image. The rotational matrix defines a system of equations rotating a component image in three dimensions (e.g., a 3×3 matrix) from a reference position in space (e.g., a camera position) such that, $$R = \begin{bmatrix} R_{11} & R_{12} & R_{13} \\ R_{21} & R_{22} & R_{23} \\ R_{31} & R_{32} & R_{33} \end{bmatrix}$$

Figure 2:
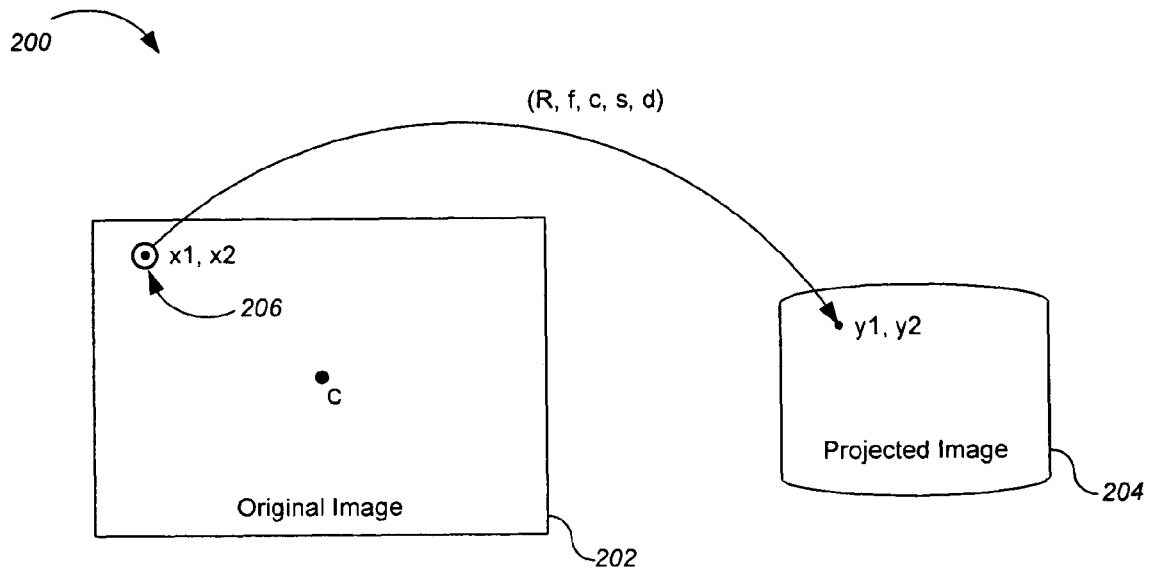
FIG. 2 illustrates an example image projection.

FIG. 2 illustrates an example image projection 200. Image projection 200 shows an original component image 202 and a projected component image 204. A point $(x_1, x_2)$ in the original image 202 is transformed by the projection into a point $(y_1, y_2)$ in the projected image 204. For convenience, and throughout this specification, the values $x_1$ and $x_2$ refer to horizontal and vertical coordinates, respectively, in the original component image. Similarly, the values $y_1$ and $y_2$ refer to horizontal and vertical coordinates, respectively, in the projected component image. Determining the point $(y_1, y_2)$ from a given $(x_1, x_2)$ is a function of the rotation matrix R, a focal length f, a center c of the original component image, a scale factor s, and a distance d of the particular image from a center image (i.e., a displacement of the particular component image from a center of projection).

Specifically, a point $(y_1, y_2)$ in the projected image corresponding to a given $(x_1, x_2)$ in the original image is defined by the following relationship:

$$y = \begin{bmatrix} y_1 \\ y_2 \end{bmatrix} = \begin{bmatrix} u_1 s_1 + d_1 \\ u_2 s_2 + d_2 \end{bmatrix} \quad (1)$$

where, $$u = \begin{bmatrix} u_1 \\ u_2 \end{bmatrix} = \begin{bmatrix} \tan^{-1}(Y_1, Y_3) \\ \dfrac{Y_2}{\sqrt{Y_1^2 + Y_3^2}} \end{bmatrix} \quad (2)$$

and, $$Y = \begin{bmatrix} Y_1 \\ Y_2 \\ Y_3 \end{bmatrix} = R \begin{bmatrix} \dfrac{(x_1 - c_1)}{f} \\ \dfrac{(x_2 - c_2)}{f} \\ 1 \end{bmatrix} \quad (3)$$

The system renders the projected composite image (step 106). The rendering includes determining the pixel values for the projected composite image. In practice, a projected image is typically constructed according to defined points on a grid such that rendering the image is performed in the opposite manner as described above. Instead, for a given point $(y_1, y_2)$ on the projected grid, a corresponding point $(x_1, x_2)$ of a corresponding original component image is identified.

Thus, equations 1-3 above become:

$$x = \begin{bmatrix} x_1 \\ x_2 \end{bmatrix} = \begin{bmatrix} v_1 f + c_1 \\ v_2 f + c_2 \end{bmatrix} \quad (4)$$

where, $$v = \begin{bmatrix} v_1 \\ v_2 \end{bmatrix} = \begin{bmatrix} \dfrac{X_1}{X_3} \\ \dfrac{X_2}{X_3} \end{bmatrix} \quad (5)$$

and, $$X = \begin{bmatrix} X_1 \\ X_2 \\ X_3 \end{bmatrix} = R^T \begin{bmatrix} \sin\left(\dfrac{y_1 - d_1}{s_1}\right) \\ \dfrac{y_2 - d_2}{s_2} \\ \cos\left(\dfrac{y_1 - d_1}{s_1}\right) \end{bmatrix} \quad (6)$$

Thus, for a known projection (e.g., a known rotational matrix, focal length, scale factor, image center, and distance from the center of projection), any coordinate in the original image can be identified from a corresponding coordinate in the projected image. The pixel values for each point in the projection component image can therefore be rendered using a corresponding pixel value for the identified coordinate in the original component image.

When a scaling between the original and projected component images is involved, and in particular when the projected component image is smaller than the original component image, a single point in the projected component image can correspond to multiple points in the original component image. Thus, in order to determine the pixel value for the point ($y_1$, $y_2$) in the projected component image, the pixel values for a region surrounding the point ($x_1$, $x_2$) are interpolated (e.g., from region 206 shown in FIG. 2).

Figure 3:
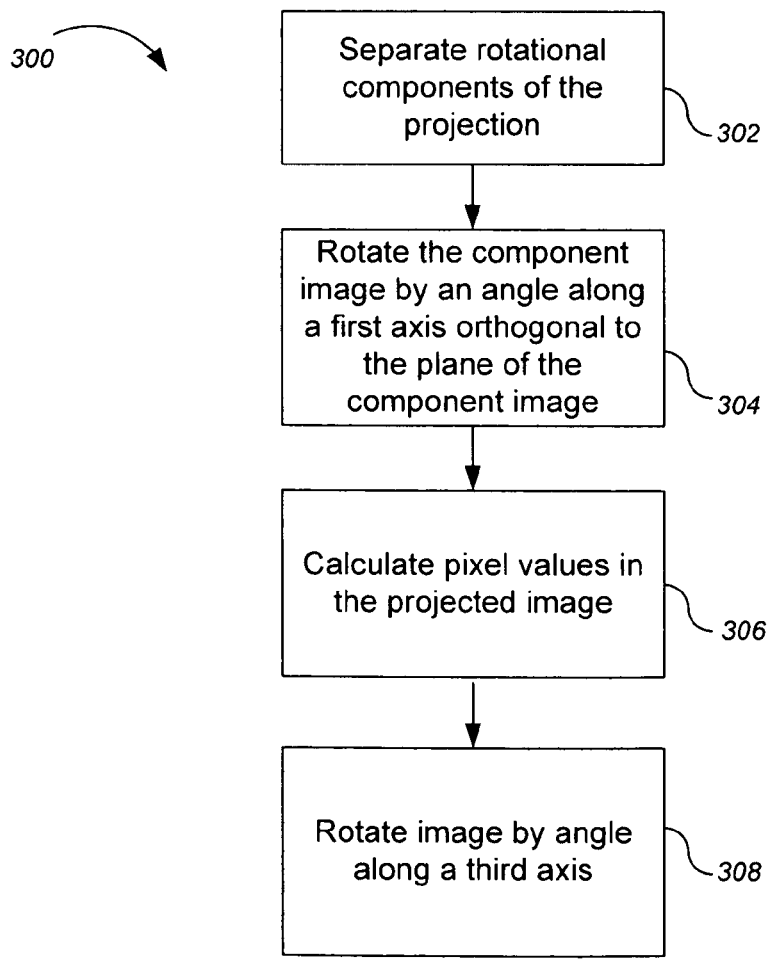
FIG. 3 illustrates an example process for rendering the composite image.

FIG. 3 illustrates an example process 300 for rendering the composite image. Again, the process will be described with reference to a computer system that performs the process. The system separates the rotational components of the projection (step 302). The rotational matrix that describes the rotation of the original component image to a projected component image describes the rotation with respect to three orthogonal axes.

Consequently, the rotational matrix can be decomposed into three rotational matrices that describe the rotational effects with respect to the individual axes. Replacing the original matrix with the decomposed rotational matrices in the equations defining the image projection allows the effects along individual axes to be isolated and performed in turn.

The system rotates the component image by an angle along a first axis orthogonal to the plane of the component image (i.e., the z-axis) (step 304). This rotation represents an in-plane rotation of the component image. Physically, this is analogous to rotating an image (e.g., clockwise or counter-clockwise) that is placed flat on a surface about an axis through the center point of the image.

Figure 4:
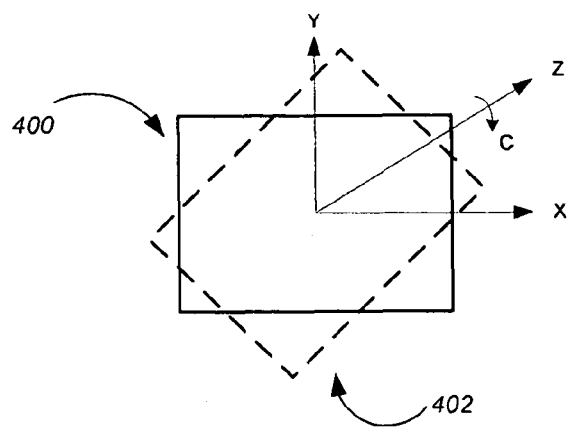
FIG. 4 illustrates an example image rotation about a first axis.

FIG. 4 shows example rotation about a first axis. In FIG. 4, an image 400 is shown with respect to x, y, and z axes, where the x and y axes are in the plane of the image 400 and the z-axis is orthogonal out of the image 400. A rotation of the z axis by an angle c rotates the image within the plane, represented by rotated image 402

The system then calculates pixel values in the projected image (step 306). Calculating pixel values includes identifying the pixel values with respect to a rotation about a second axis while disregarding any rotation about the third axis. Additionally, the pixel values are calculated by processing each row of the image sequentially followed by each column of the image.

The pixel values for each row are calculated by looking at each row in isolation. Thus, $y_2$ is held constant for each $y_1$ in the row. By manipulating the projection equations 1-6 above, the corresponding set of points ($x_1$, $x_2$) in a corresponding row of the original image can be identified. The pixel value corresponding to each identified ($x_1$, $x_2$) is then used to determine the corresponding pixel value ($y_1$, $y_2$) in the projected image. The pixel value each point ($y_1$, $y_2$) can be an interpolated value if there is a change in scale between the original version and the projected version of the component image. For example, if the projected version of the component image is smaller than the original version, the pixel value of a point ($y_1$, $y_2$) is interpolated from values in the original image. However, since only the row is being considered, the interpolated value is assessed based only on row values surrounding the point $x_1$, not a two dimensional region (e.g., region 206 in FIG. 2). Various interpolation techniques can be used, for example, nearest neighbor interpolation, linear interpolation, and cubic interpolation.

Figure 5:
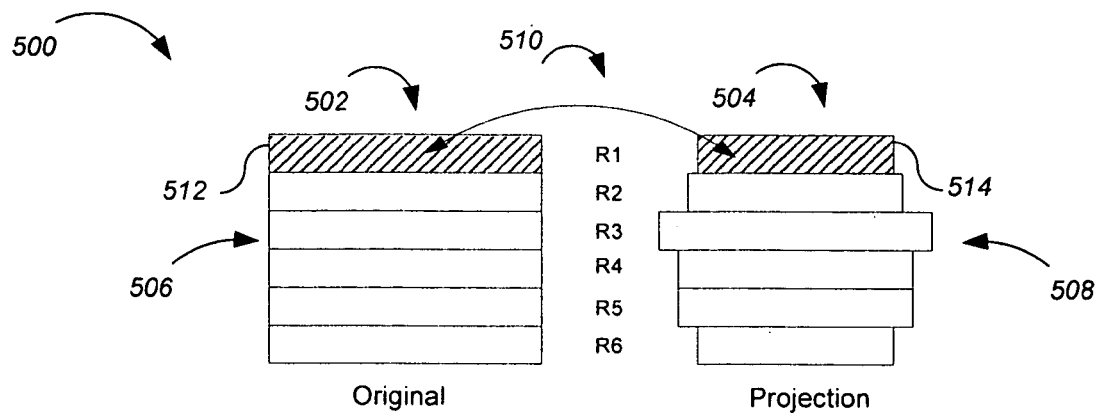
FIG. 5 illustrates an example of rendering image rows independently of column.

FIG. 5 illustrates an example diagram 500 of rendering image rows independently of columns. Diagram 500 shows an original component image 502 and a projected component image 504. The original image 502 is separated into a number of rows 506. Similarly, the projected image 504 is separated into a number of corresponding rows 508. A particular row 512 of the original image 502 corresponds to a row 514 in the projected image 504 according to a transform 510. The transform 510 includes the projection properties previously described, but only considering a rotation component along a single axis. Each row 508 in the projected image 504 does not necessarily have a same width as the corresponding row 506 in the original image 502. Additionally, the rows 508 can have different widths depending on where the respective row is located in the image.

Next, the pixel values for each column are calculated by looking at each column in isolation. Thus, $y_1$ is held constant for each $y_2$ in the column. By manipulating the projection equations 1-6 above, the corresponding set of points ($x_1$, $x_2$) in a corresponding column of the original image can be identified. The pixel value corresponding to each identified ($x_1$, $x_2$) is then used to determine the corresponding pixel value ($y_1$, $y_2$) in the projected image. The pixel value of each point ($y_1$, $y_2$) can be an interpolated value if there is a change in scale between the original version and the projected version of the component image. For example, if the projected version of the component image is smaller than the original version, the pixel value of a point ($y_1$, $y_2$) is interpolated from values in the original image. However, since only the column is being considered, the interpolated value is assessed based only on column values surrounding the point $x_2$, not a two dimensional region. As with the rows, various interpolation techniques can be used, for example, nearest neighbor interpolation, linear interpolation, and cubic interpolation.

Figure 6:
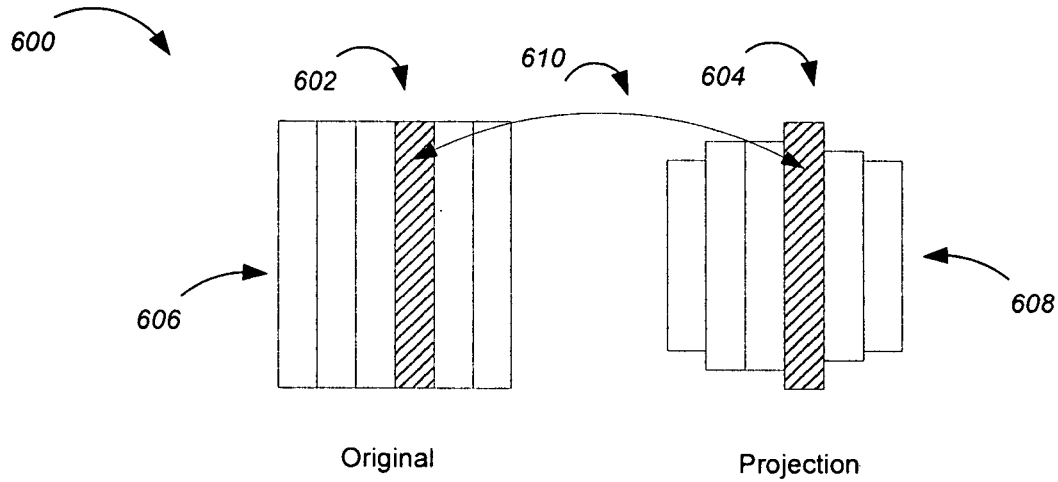
FIG. 6 illustrates an example of rending image columns independently of rows.

FIG. 6 illustrates an example diagram 600 of rendering image columns independently of rows. Diagram 600 shows an original component image 602 and a projected component image 604. The original image 602 is separated into a number of columns 606. Similarly, the projected image 604 is separated into a number of corresponding columns 608. A particular column 612 of the original image 602 corresponds to a column 614 in the projected image 604 according to a transform 610. The transform 610 includes the projection properties previously described, but only considering a rotation component along a single axis. Similar to diagram 500 shown in FIG. 5, each column 608 in the projected image 604 does not necessarily have a same height as the corresponding column 606 in the original image 602. Additionally, the columns 608 of the projected image 604 can have different heights.

In some implementations, aliasing resulting from image scaling is reduced using a decimation process (e.g., when the original image is at least twice the size of the projected image). When computing values for a row (or a column) in the projected image, the corresponding row of the original image is down-sampled. The row of the original image is down-sampled to a size comparable to the size of the row in the projected image. For example, given a row in an original image has 1000 pixels and a known output row size of 201 pixels, the row in the original image can be down-sampled to 201 pixels. The down-sampling can be performed using a box-filter, which reduces aliasing effects. A similar process is applied when computing values for each column in the projected image.

As shown in FIG. 3, the system rotates the image by an angle along a third axis (e.g., the y-axis) corresponding to a position shift along the projected surface (e.g., horizontally along the interior surface of the cylinder) (step 308). More specifically, if the y-axis represents a vertical axis through the camera position, a rotation about y is analogous to the change in the view resulting from rotating the camera about that axis. In some implementations, with respect to the image projection, this rotation can be represented by a shift in the bounding box of the component image. Thus, the shift caused by the rotation does not effect the previous rotation and pixel value calculations for the projected image.

In an alternative implementation, the final rotation is applied such that the component image is rendered into the correct location on the cylinder. For example, a temporary buffer can be used to store a copy of the calculated position information. The component image can then be rendered into the shifted position directly using the buffered data, instead of shifting the image after rendering. Following this last rotation, the image has been completely rendered. Each component image is similarly rendered by separating out the rendering operation into discrete operations with respect to individual axes in order to render a composite image.

Figure 7:
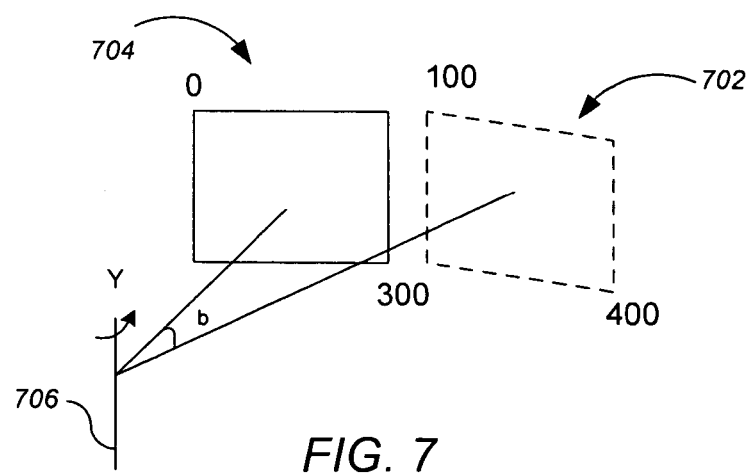
FIG. 7 illustrates an example image rotation about a second axis.

FIG. 7 illustrates an example rotation about the third axis (e.g., the y-axis). In FIG. 7, first projected image 702 is shown prior to the rotation about the y-axis 706. A second projected image 704 shows the same projected image following a rotation about the y-axis 706 by an angle b. The coordinates of the bounding box for the first and second projected images 702 and 704 have been adjusted to correspond to the shift in position along the projection surface.

More particularly, an example of the operations performed to render the composite image is described in the following paragraphs.

As discussed above, the rotational matrix R is decomposed into a product of three rotational matrices $R_a$, $R_b$, and $R_c$, where each rotational matrix defines the rotation of the image with respect to a particular axis.

Thus R becomes $R_a R_b R_c$ where, $$R_c = \begin{bmatrix} \cos(c) & \sin(c) & 0 \\ -\sin(c) & \cos(c) & 0 \\ 0 & 0 & 1 \end{bmatrix} R_b = \begin{bmatrix} \cos(b) & 0 & \sin(b) \\ 0 & 1 & 0 \\ -\sin(b) & 0 & \cos(b) \end{bmatrix}$$

$$R_a = \begin{bmatrix} 1 & 0 & 0 \\ 0 & \cos(a) & \sin(a) \\ 0 & -\sin(a) & \cos(a) \end{bmatrix}$$

R then becomes:

$$R = \begin{bmatrix} \cos(b)\cos(c) + \sin(b)\sin(a)\sin(c) & \cos(b)\sin(c) - \sin(b)\sin(a)\cos(c) & \sin(b)\cos(a) \\ -\cos(a)\sin(c) & \cos(a)\cos(c) & \sin(a) \\ -\sin(b)\cos(c) + \cos(b)\sin(a)\sin(c) & -\sin(b)\sin(c) - \cos(b)\sin(a)\cos(c) & \cos(b)\cos(a) \end{bmatrix}$$

For a give rotational matrix R, the system of equations in can be solved for angles a, b, and c corresponding to the angle of rotation for each respective axis such that:

$$b = \tan^{-1}(R_{13}, R_{33})$$

$$a = \tan^{-1}(-R_{21}, R_{22})$$

$$c = \tan^{-1}\left(R_{23}, \frac{(R_{13} + R_{33})}{(\sin(b) + \cos(b))}\right)$$

Applying the decomposed R to equations 1-6 above, the effects of each axis individually on the projection can be analyzed. First, beginning with the rotation about the first axis (z-axis) orthogonal to the plane of the component image, equation (3) above becomes:

$$Y = R \begin{bmatrix} \frac{(x_1 - c_1)}{f} \\ \frac{(x_2 - c_2)}{f} \\ 1 \end{bmatrix} = R_b R_a R_c \begin{bmatrix} \frac{(x_1 - c_1)}{f} \\ \frac{(x_2 - c_2)}{f} \\ 1 \end{bmatrix}$$

To look at the effect of the rotation about z, we ignore $R_b$ and $R_a$. The equation then becomes:

$$R_c \begin{bmatrix} \frac{(x_1 - c_1)}{f} \\ \frac{(x_2 - c_2)}{f} \\ 1 \end{bmatrix} = \begin{bmatrix} \frac{\cos(c)(x_1 - c_1) + \sin(c)(x_2 - c_2)}{f} \\ \frac{-\sin(c)(x_2 - c_2) + \cos(c)(x_2 - c_2)}{f} \\ 1 \end{bmatrix}$$

The resulting describes an operation that is just a rotation about the z-axis by the angle c, scaled by focal length f. The rotation about the z-axis is represented as a rotation of about an axis orthogonal to the surface of the image, thus the rotation about z is "spinning" the image about the center point by angle c as shown in FIG. 4 above.

The coordinate values can be calculated with respect to a rotation only in the x-direction (e.g., an axis corresponding to a tilting rotation of the image) defined by $R_a$. Since only one rotation is involved, the computations necessary to identify the coordinates of the image are simplified.

$$\text{Let } z = \begin{bmatrix} z_1 \\ z_2 \end{bmatrix} = \begin{bmatrix} \cos(c)(x_1 - c_1) + \sin(c)(x_2 - c_2) \\ -\sin(c)(x_2 - c_2) + \cos(c)(x_2 - c_2) \end{bmatrix}$$

Then applying z to equations 1-6 above results in:

$$Y = R_b R_a R_c \begin{bmatrix} \frac{(x_1 - c_1)}{f} \\ \frac{(x_2 - c_2)}{f} \\ 1 \end{bmatrix} = R_b R_a \begin{bmatrix} z_1/f \\ z_2/f \\ 1 \end{bmatrix}$$

Ignoring the rotation applied by $R_b$ provides:

$$R_a \begin{bmatrix} z_1/f \\ z_2/f \\ 1 \end{bmatrix} = \begin{bmatrix} 1 & 0 & 0 \\ 0 & \cos(a) & \sin(a) \\ 0 & -\sin(a) & \cos(a) \end{bmatrix} \begin{bmatrix} z_1/f \\ z_2/f \\ 1 \end{bmatrix} = \begin{bmatrix} \frac{z_1}{f} \\ \frac{\cos(a)(z_2)}{f} + \sin(a) \\ \frac{-\sin(a)(z_2)}{f} + \cos(a) \end{bmatrix}$$

Applying this to equation 4 above, the coordinates in the original component image can be written as:

$$x = \begin{bmatrix} x_1 \\ x_2 \end{bmatrix} = \begin{bmatrix} s_1 \tan^{-1}\left(\frac{z_1}{f}, -\sin(a)\frac{z_2}{f} + \cos(a)\right) + d_1 \\ \frac{s_2(\cos(a)(z_2)/f + \sin(a))}{\sqrt{\left(\frac{z_1}{f}\right)^2 + \left(\frac{-\sin(a)(z_2)}{f} + \cos(a)\right)^2}} + d_2 \end{bmatrix}$$

The equation for x can be manipulated to hold $x_1$ or $x_2$ constant in order to identify values for a particular row or column in the component image. When examining rows only, $x_2$ is held constant for each given row. Thus, the equation above is modified to define row values in terms of a constant column value.

$$w = \begin{bmatrix} w_1 \\ w_2 \end{bmatrix} = \begin{bmatrix} s_1 \tan^{-1}\left(\frac{z_1}{f}, \frac{-\sin(a)(z_2)}{f} + \cos(a)\right) + d_1 \\ z_2 \end{bmatrix}$$

where $w_2 = z_2$ and where $z_2$ is fixed for a given row.

Thus, we can calculate each $x_1$ coordinate for a row while keeping $x_2$ constant. The pixel values can be determined for each point $(y_1, y_2)$ in the row corresponding to the point $(x_1, x_2)$ in the row as described above with respect to FIG. 3. In some implementations, the pixel value is interpolated when the scale has changed. Additionally, aliasing effects can be reduced using the decimation process described above.

Similarly, when examining column values independent of rows, $x_1$ is held constant for each given column. Thus, the equation above is modified to define row values in terms of a constant column value. By letting $x_1 = w_1$, the equation changes to:

$$x = \begin{bmatrix} x_1 \\ x_2 \end{bmatrix} = \begin{bmatrix} w_1 \\ s_2 \left( \frac{\frac{\cos(a)(w_1)}{f} + \sin(a)}{\frac{-\sin(a)(w_1)}{f} + \cos(a)} \right) \frac{1}{\sqrt{\left(\tan^2\left(\frac{w_1 - d_1}{s_1}\right)\right) + 1}} \end{bmatrix}$$

The pixel values can be determined for each point $(y_1, y_2)$ in the column corresponding to the point $(x_1, x_2)$ in the column. The final pixel value can then be calculated using the pixel value from the row and column calculations, e.g., by averaging the pixel value for each point $(y_1, y_2)$ calculated by row and column.

After the image pixel values have been determined, the final rotational is applied, which is a rotation about the y-axis. This corresponds with a shift in the image position along the projection surface (e.g., along a cylinder or sphere).

Looking to the effect of the rotation about the y-axis corresponding to $R_b$. First a variable Z is defined in order to isolate $R_b$:

$$\text{Let } Z = \begin{bmatrix} Z_1 \\ Z_2 \\ Z_3 \end{bmatrix} = R_a R_c \begin{bmatrix} \frac{(x_1 - c_1)}{f} \\ \frac{(x_2 - c_2)}{f} \\ 1 \end{bmatrix}$$

then, $$Y = R_b R_a R_c \begin{bmatrix} \frac{(x_1 - c_1)}{f} \\ \frac{(x_2 - c_2)}{f} \\ 1 \end{bmatrix} = R_b Z = \begin{bmatrix} \cos(b)Z_1 + \sin(b)Z_3 \\ Z_2 \\ -\sin(b)Z_1 + \cos(b)Z_3 \end{bmatrix}$$

Substituting the above into equations 1-6 above, x can be found as:

$$x = \begin{bmatrix} x_1 \\ x_2 \end{bmatrix} = \begin{bmatrix} s_1(\tan^{-1}(\cos(b)Z_1 + \sin(b)Z_3, \sin(b)Z_1 + \cos(b)Z_3)) + d_1 \\ s_2 \frac{Z_2}{\sqrt{(\cos(b)Z_1 + \sin(b)Z_3)^2 + (-\sin(b)Z_1 + \cos(b)Z_3)^2}} + d_2 \end{bmatrix}$$

$$= \begin{bmatrix} s_1(\tan^{-1}(Z_1, Z_3) + b) + d_1 \\ s_2 \frac{Z_2}{\sqrt{(Z_1^2 + Z_3^2)}} + d_2 \end{bmatrix}$$

Since the angle b only appears in the $x_1$ coordinate value, this indicates that the effect of $R_b$ (i.e., the rotation about the y-axis) to offset the image along the surface of the projected cylinder is controlled by $s_1(b)$. The offset is only in the horizontal direction because the value of $x_2$ is constant with respect to the rotational angle b. This effect can be reproduced simply by adjusting the bounding box of the pixel data.

Each component image of the projected image can be rendered in a similar manner to generate the final composite image. The final composite image can be stored, displayed (e.g., on a display device or printer), or further edited (e.g., to correct distortions, to smooth image boundaries, or to perform other editing effects).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a set of component images for forming a composite image;
   defining a projection for the set of images transforming each component image into a projected component image; and
   rendering the projected component images to form the composite image, and where rendering each projected component image includes:
   decomposing a rotation of the projection into separate rotations for each axis of a plurality of orthogonal axes;
   rotating the component image about a first axis of the plurality of orthogonal axes;
   separately identifying pixel values for each row and each column of the projected component image; and
   rotating the image about a third axis of the plurality of orthogonal axes to form a rendered component image.

2. The method of claim 1, where rotating the component image about the first axis includes isolating the effect of the rotation about the first axis, where the first axis is orthogonal to a plane of the component image.

3. The method of claim 1, where identifying pixel values for a row comprises:
   defining the coordinates of the component image with respect to a rotation about a second axis of the plurality of orthogonal axes while disregarding rotations about any other axis;
   holding the column value constant for each point in a particular row of the component image; and
   calculating the pixel value for pixels in each row of the projected component image using one or more pixel values in the corresponding row of the original component image.

4. The method of claim 3, further comprising:
   down-sampling the row of the original component image to match a size of the corresponding row of the projected component image prior to calculating pixel values for points in the row of the projected component image.

5. The method of claim 1, where identifying pixel values for a column comprises:
   defining the coordinates of the component image with respect to a rotation about a second axis of the plurality of orthogonal axes while disregarding rotations about any other axis;
   holding the row value constant for each point in a particular column of the component image; and
   calculating the pixel value for pixels in each column of the projected component image using one or more pixel values in the corresponding column of the original component image.

6. The method of claim 5, further comprising:
   down-sampling the column of the original component image to match a size of the corresponding column of the projected component image prior to calculating pixel values for points in the column of the projected component image.

7. The method of claim 1, where rotating the component image about the second axis includes shifting the image along a projection surface.

8. The method of claim 1, where rendering each projected component image includes combining the separately identified pixel values for each row and each column of the projected component image.

9. A computer program product, encoded on a computer-readable medium, operable to cause data processing apparatus to perform operations comprising:
   receiving a set of component images for forming a composite image;
   defining a projection for the set of images transforming each component image into a projected component image; and
   rendering the projected component images to form the composite image, and where rendering each projected component image includes:
   decomposing a rotation of the projection into separate rotations for each axis of a plurality of orthogonal axes;
   rotating the component image about a first axis of the plurality of orthogonal axes;
   separately identifying pixel values for each row and each column of the projected component image; and
   rotating the image about a third axis of the plurality of orthogonal axes to form a rendered component image.

10. The computer program product of claim 9, where rotating the component image about the first axis includes isolating the effect of the rotation about the first axis, where the first axis is orthogonal to a plane of the component image.

11. The computer program product of claim 9, where identifying pixel values for a row comprises:
    defining the coordinates of the component image with respect to a rotation about a second axis of the plurality of orthogonal axes while disregarding rotations about any other axis;
    holding the column value constant for each point in a particular row of the component image; and
    calculating the pixel value for pixels in each row of the projected component image using one or more pixel values in the corresponding row of the original component image.

12. The computer program product of claim 11, further comprising:
    down-sampling the row of the original component image to match a size of the corresponding row of the projected component image prior to calculating pixel values for points in the row of the projected component image.

13. The computer program product of claim 9, where identifying pixel values for a column comprises:

defining the coordinates of the component image with respect to a rotation about a second axis of the plurality of orthogonal axes while disregarding rotations about any other axis;

holding the row value constant for each point in a particular column of the component image; and calculating the pixel value for pixels in each column of the projected component image using one or more pixel values in the corresponding column of the original component image.

14. The computer program product of claim 13, further comprising:

down-sampling the column of the original component image to match a size of the corresponding column of the projected component image prior to calculating pixel values for points in the column of the projected component image.

15. The computer program product of claim 9, where rotating the component image about the second axis includes shifting the image along a projection surface.

16. The computer program product of claim 9, where rendering each projected component image includes combining the separately identified pixel values for each row and each column of the projected component image.

17. A system comprising:

a user interface device; and one or more computers operable to interact with the user interface device and to:

receive a set of component images for forming a composite image;

define a projection for the set of images transforming each component image into a projected component image; and render the projected component images to form the composite image, and where rendering each projected component image includes:

decomposing a rotation of the projection into separate rotations for each axis of a plurality of orthogonal axes;

rotating the component image about a first axis of the plurality of orthogonal axes;

separately identifying pixel values for each row and each column of the projected component image; and rotating the image about a third axis of the plurality of orthogonal axes to form a rendered component image.

18. The system of claim 17, wherein the one or more computers comprise a server operable to interact with the user interface device through a data communication network, and the user interface device is operable to interact with the server as a client.

19. The system of claim 18, wherein the user interface device comprises a personal computer running a web browser or a mobile telephone running a WAP browser.

20. The system of claim 17, wherein the one or more computers comprises one personal computer, and the personal computer comprises the user interface device.

21. The system of claim 17, where rotating the component image about the first axis includes isolating the effect of the rotation about the first axis, where the first axis is orthogonal to a plane of the component image.

22. The system of claim 17, where identifying pixel values for a row comprises:

defining the coordinates of the component image with respect to a rotation about a second axis of the plurality of orthogonal axes while disregarding rotations about any other axis;

holding the column value constant for each point in a particular row of the component image; and calculating the pixel value for pixels in each row of the projected component image using one or more pixel values in the corresponding row of the original component image.

23. The system of claim 22, further operable to:

down-sample the row of the original component image to match a size of the corresponding row of the projected component image prior to calculating pixel values for points in the row of the projected component image.

24. The system of claim 17, where identifying pixel values for a column comprises:

defining the coordinates of the component image with respect to a rotation about a second axis of the plurality of orthogonal axes while disregarding rotations about any other axis;

holding the row value constant for each point in a particular column of the component image; and calculating the pixel value for pixels in each column of the projected component image using one or more pixel values in the corresponding column of the original component image.

25. The system of claim 24, further operable to:

down-sample the column of the original component image to match a size of the corresponding column of the projected component image prior to calculating pixel values for points in the column of the projected component image.

26. The system of claim 17, where rotating the component image about the second axis includes shifting the image along a projection surface.

27. The system of claim 17, where rendering each projected component image includes combining the separately identified pixel values for each row and each column of the projected component image.

* * * * *